United States Patent [19]

Briscoe et al.

[11] 4,440,653

[45] Apr. 3, 1984

[54] HIGHLY STABLE ALCOHOL FOAMS AND METHODS OF FORMING AND USING SUCH FOAMS

[75] Inventors: James E. Briscoe; Phillip C. Harris; Glenn S. Penny, all of Duncan, Okla.

[73] Assignee: Halliburton Company, Duncan, Okla.

[21] Appl. No.: 355,990

[22] Filed: Mar. 8, 1982

[51] Int. Cl.³ .................... C09K 7/00; E21B 43/16
[52] U.S. Cl. .................... 252/8.55 R; 134/22.18; 166/305 R; 166/308; 252/8.55 D; 252/307
[58] Field of Search ............ 252/8.55 R, 8.55 B, 252/307, 8.55 D; 134/22.18; 166/305 R, 308

[56] References Cited

U.S. PATENT DOCUMENTS

| | | | |
|---|---|---|---|
| 3,083,224 | 3/1963 | Brace et al. | 260/461 |
| 4,165,338 | 8/1979 | Katsushima et al. | 564/285 |
| 4,288,334 | 9/1981 | McCoy et al. | 252/8.55 D |
| 4,293,441 | 10/1981 | Newell et al. | 252/389 A |
| 4,301,868 | 11/1981 | Scherubel et al. | 252/8.55 R |

OTHER PUBLICATIONS

Clark, et al., 1979, The Use of Fluorochemical Surfactants in Non–Aqueous Stimulation Fluids, SPE Paper #7894, American Institute of Mining, Metallurgical and Petroleum Engineers, Inc.

*Primary Examiner*—Herbert B. Guynn
*Assistant Examiner*—Howard J. Locker
*Attorney, Agent, or Firm*—Robert A. Kent; Thomas R. Weaver

[57] ABSTRACT

Highly stable high alcohol content foams are provided which include a foam-forming surfactant represented by the formula

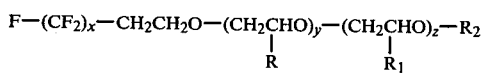

Methods of forming and using the alcohol foams are also provided.

32 Claims, No Drawings

HIGHLY STABLE ALCOHOL FOAMS AND METHODS OF FORMING AND USING SUCH FOAMS

The present invention relates to highly stable high alcohol content foams and methods of forming and using such foams. The foams are particularly suitable as carrier fluids in carrying out various processes including processes for treating subterranean formations.

Foamed carrier and treating fluids have been utilized heretofore in subterranean formation stimulation and industrial cleaning processes. The use of a foamed fluid in carrying out a well stimulation process is particularly advantageous since the liquid phase in the foam is less by volume than in conventional fluids, and as a result, fluid loss to permeable subterranean formations encountered by the foam is less. Further, because of the expandable gas phase in the foam, the treating fluid is rapidly removed from a treated formation. Foamed fluids are particularly suitable for use as fracturing fluids in subterranean formation fracturing procedures to stimulate the recovery of hydrocarbons therefrom in that they have ideal fracture proppant material suspending and transporting properties. In well cleanup and industrial cleaning operations, foams easily suspend and carry released fines.

Liquids utilized as the liquid phase in foams employed heretofore include water, hydrocarbons and aqueous alcohol solutions. The use of one or more alcohols in the liquid phase of foamed fluids utilized in subterranean formation treatments is particularly advantageous where the subterranean formation is sensitive to the intrusion of water foreign to the formation. Such water-sensitive formations generally contain clays which are irreparably damaged upon foreign water contact due to the swelling of the clays and/or the migration of fines as a result thereof. The swelling of clays and/or migration of fines is less likely when contacted by alcohol or an aqueous alcohol solution containing a high alcohol content. In addition, lower formation capillary pressures result when alcohol containing fluids are used since both the viscous structuring of water (on silicate surfaces) is less likely, and the interfacial tension is reduced. This results in faster and more complete cleanup of the formation after the treatment is carried out. Other factors that can result in quickly achieving production capacity of a subterranean formation treated with high alcohol content fluids are the higher vapor pressure of alcohol fluids and the partial miscibility of oil and alcohol.

While, as stated above, foams formed from water-alcohol mixtures have been utilized heretofore, such foams have not included high quantites of alcohol in the liquid phase. That is, the foam-forming agents utilized heretofore have been incapable of forming stable foams when the liquid phase contains a high alcohol content.

By the present invention, highly stable foams containing high alcohol contents (the liquid phase of the foams can be 100% alcohol) and methods of forming and using such foams are provided. Further, lower alcohols, which have heretofore been considered to be foam breakers rather than foam promoting chemicals can be utilized in the liquid phases of the foams of the present invention. The term "lower alcohols" is used herein to mean organic alcohols having relatively low carbon atom contents, i.e., from 1 to 3 carbon atoms.

A variety of alkyl alcohols can be utilized in the liquid phases of the foams of the present invention. Of these, the lower alkyl alcohols are preferred with an alcohol or mixture of alcohols selected from the group consisting of methanol, ethanol, n-propanol, and isopropanol being the most preferred. As mentioned above, the liquid phase can be comprised of pure alcohol or the liquid phase can contain water, i.e., an aqueous alcohol solution can be utilized. In using the alcohol foams of this invention as treating fluids for carrying out subterranean formation stimulation procedures such as formation fracturing procedures, the liquid phase is preferably 100% alcohol or an aqueous alcohol solution wherein one or more alcohols are present in the solution in an amount in the range of from about 50% to about 99% by weight of the solution.

The highly stable alcohol foams of this invention include a foam-forming and stabilizing surfactant or mixture of such surfactants. More specifically, the surfactant utilized in accordance with the present invention is a nonionic surfactant or mixture of nonionic surfactants selected from the group represented by the formula:

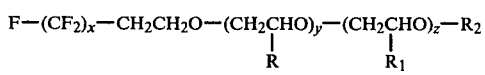

wherein x is an integer of from 2–12, or an integer or fractional integer representing an average value of from 2–12; y and z are each individually integers of from 0–20 or integers or fractional integers representing an average value of from 0–20; R and $R_1$ are each individually hydrogen or an aliphatic hydrocarbon radical containing from 1–4 carbon atoms; and $R_2$ is hydrogen or an ester group of the formula

wherein $R_3$ is an aliphatic hydrocarbon radical containing from 1–4 carbon atoms.

The term "integer or fractional integer representing an average value" is used herein to mean that the formula may represent an admixture of compounds wherein the average values of x, y and z can be any integer in the range given such as 8 or a fractional integer such as 7.5, 7.8 and the like.

Preferred nonionic surfactants for use in accordance with this invention are as follows:

(1) A nonionic surfactant of the above formula wherein x is an average value of 8, y is 2, z is 0, and R, $R_1$ and $R_2$ are all hydrogen;
(2) A nonionic surfactant of the above formula wherein x is an average value of 8, y is 5, z is 0, R is methyl, and $R_1$ and $R_2$ are each hydrogen;
(3) A nonionic surfactant of the above formula wherein x is an average value of 8, y is 2, z is 0, R is hydrogen, $R_1$ is a methyl, and $R_2$ is hydrogen;
(4) A nonionic surfactant of the above formula wherein x is an average value of 8, y is 2, z is 2, R is methyl, and $R_1$ and $R_2$ are hydrogen; and
(5) A nonionic surfactant of the above formula wherein x is an average value of 8, y is 5, z is 0, R is methyl, $R_1$ is hydrogen, $R_2$ is

and $R_3$ is methyl.

Of the various nonionic surfactants of the above formula, the most preferred is where x is an average value of 8, y is 2, z is 0, and R, $R_1$ and $R_2$ are all hydrogen.

The above described surfactants bring about and stabilize foams of alcohols or aqueous solutions thereof, i.e., when one or more of the surfactants are combined with pure alcohol or high alcohol content aqueous solutions and a gas or mixture of gases such as nitrogen, air or $CO_2$ is introduced thereinto, a highly stable foam results.

As indicated above, the nonionic surfactant or mixture of surfactants utilized is first combined with a base liquid of alcohol, a mixture of alcohols or an aqueous alcohol solution. Generally, the surfactant or surfactants are combined with the alcohol containing liquid in an amount of from about 0.1% to about 2.0% by weight of the liquid. Upon foaming the resulting mixture with nitrogen or other gas, a stable foam is formed. In order to increase the foam stability, a small quantity of a viscosifying agent can optionally be combined with the liquid phase prior to foaming. Suitable such viscosifying agents are compounds such as hydroxypropyl guar, hydroxyethylcellulose and polyvinyl pyrrolidone. Generally, the viscosifying agent is combined with the base liquid in an amount in the range of from about 0.05% to about 0.50% by weight of the liquid.

In using the alcohol foams as carrier fluids in carrying out treatments in subterranean formations, a foam is formed as described above by combining the foam-forming surfactant or surfactants with one or more alcohols or an aqueous solution thereof, combining a viscosifying agent, if used, with the base liquid as well as the components to be carried thereby, and then foaming the liquid with a gas or mixture of gases such as air, carbon dioxide or nitrogen, preferably nitrogen. Once formed, the foamed carrier fluid and carried component are introduced into the subterranean formation.

In utilizing the foams of this invention as carrier or treating fluids for water-sensitive clay-containing subterranean formations, the liquid phase is preferably comprised of pure alcohol, a mixture of alcohols or an aqueous alcohol solution having a high concentration of alcohol therein, i.e., a concentration of from about 80% to about 99% alcohol by weight of solution.

In carrying out the fracturing of subterranean formations to stimulate the recovery of hydrocarbons therefrom using the foams of this invention as fracturing fluids, a foam is first formed in the manner described above. If fracture proppant material is to be suspended in the fracturing fluid whereby it is carried into and deposited in created fractures, such proppant material is combined with the base liquid followed by the foaming of the liquid as indicated above. Once formed, the fluid is introduced into the formation.

In using the foams of this invention as carrier fluids in industrial cleaning processes, the foams are formed as indicated above, with or without carried cleaning components, and then brought into contact with surfaces to be cleaned, either by flowing the foams past the surfaces or by static contact therewith.

As stated above, the highly stable high alcohol content foams of this invention are particularly suitable as carrier fluids or treating fluids for subterranean formation treatment processes in that the foams exhibit low fluid loss to permeable formations and when in contact with water-sensitive materials in the formations, bring about less damage thereto.

In order to facilitate a clear understanding of the highly stable alcohol foams and methods of the present invention, the following examples are given.

EXAMPLE 1

Various of the nonionic surfactants described above are dissolved by stirring in pure methyl alcohol in quantities of 10 gallons of surfactant per 1000 gallons of alcohol. A 500 milliliter portion of each of the resulting solutions is placed in a liquid reservoir pressurized with nitrogen and the liquid under pressure expelled from the reservoir through an orifice mixer. A separate stream of pressurized nitrogen is injected into the liquid in the orifice mixer whereby the liquid is foamed. The resultant foam is expelled from the mixer at atmospheric pressure and collected in a 500 ml graduated cylinder.

The times required for one-half of the liquid to drain out of the foams produced in accordance with the above procedure are recorded. The longer the half-drain time, the greater the static stability of the foam.

The qualities (% gas volume) of the foams are also determined and recorded. Higher quality foams are indicative of good gas incorporation into the liquid phase.

The results of these tests are given in Table I below.

TABLE I

QUALITIES AND HALF-DRAIN TIMES OF METHYL ALCOHOL FOAMS

| Nonionic Surfactant Used | | | | | | Half-Drain Time, Min:Sec. | Quality, % |
|---|---|---|---|---|---|---|---|
| x | y | z | R | $R_1$ | $R_2$ | | |
| 8 | 8 | 0 | H | — | H | 0:25 | 56 |
| 8 | 6 | 0 | H | — | H | 0:46 | 59 |
| 8 | 4 | 0 | H | — | H | 2:20 | 70 |
| 8 | 2 | 0 | H | — | H | 4:30 | 70 |
| 8 | 0 | 0 | — | — | H | 4:00 | 73 |
| 8 | 12 | 0 | $CH_3$ | — | H | 0:12 | 56 |
| 8 | 8 | 0 | $CH_3$ | — | H | 0:18 | 65 |
| 8 | 6 | 0 | $CH_3$ | — | H | 1:05 | 60 |
| 8 | 5 | 0 | $CH_3$ | — | H | 1:50 | 60 |
| 8 | 4 | 0 | $CH_3$ | — | H | 2:35 | 63 |
| 8 | 2 | 0 | $CH_3$ | — | H | 0:36 | 76 |
| 8 | 2 | 1 | $CH_3$ | H | H | 2:50 | 68 |
| 8 | 2 | 2 | $CH_3$ | H | H | 0:43 | 66 |
| 8 | 5 | 1 | $CH_3$ | H | H | 0:15 | 61 |
| 8 | 5 | 2 | $CH_3$ | H | H | 0:11 | 57 |
| 8 | 5 | 0 | $CH_3$ | — | $COCH_3$ | 0:14 | 61 |
| 8 | 2 | 2 | H | $CH_3$ | H | 1:55 | 64 |
| FC-431[1] | | | | | | 0:10 | 48 |

[1] A perfluoro substituted sulfonamide formulation commercially available from 3M Company of Saint Paul, Minnesota.

EXAMPLE 2

A nonionic surfactant of the type described above wherein x is an average value of 8, y is 2, z is 0 and R and $R_2$ are hydrogen is dissolved in pure methyl alcohol in various amounts, in an aqueous alcohol solution containing 95% by volume methyl alcohol in various amounts, and in an aqueous alcohol solution containing 80% by volume methyl alcohol in various amounts. The resulting liquid solutions are foamed and the qualities and half-drain times thereof are determined in accordance with the procedure described in Example 1. The results of these tests are given in Table II below.

TABLE II

QUALITIES AND HALF-TIMES OF PURE METHYL ALCOHOL FOAMS AND FOAMS FORMED OF AQUEOUS METHYL ALCOHOL SOLUTIONS

| Liquid Phase | Quantity of Surfactant Dissolved In Liquid Phase, Gallons/1000 Gallons | Half-Drain Time Min:Sec. | Quality % |
|---|---|---|---|
| Pure Methyl Alcohol | 10 | 4:30 | 70 |
| Pure Methyl Alcohol | 7 | 1:50 | 63 |
| Pure Methyl Alcohol | 5 | 0:15 | 60 |
| Pure Methyl Alcohol | 2 | 0:00 | — |
| 95% Methyl Alcohol Solution | 10 | 16:30 | 73 |
| 95% Methyl Alcohol Solution | 7 | 14:34 | 69 |
| 95% Methyl Alcohol Solution | 5 | 4:30 | 69 |
| 95% Methyl Alcohol Solution | 2 | 0:28 | 61 |
| 80% Methyl Alcohol Solution | 10 | >60:00 | 79 |
| 80% Methyl Alcohol Solution | 5 | 39:00 | 75 |
| 80% Methyl Alcohol Solution | 2 | 10:00 | 65 |

From the above Examples it can be seen that the foams formed in accordance with the present invention have excellent properties.

We claim:

1. A method of forming a highly stable foam containing alcohol comprising the steps of:
combining a foam-forming surfactant with a liquid selected from the group consisting of one or more alcohols and aqueous solutions thereof, said foam-forming surfactant being a nonionic surfactant or mixture of nonionic surfactants selected from the group represented by the formula:

$$F-(CF_2)_x-CH_2CH_2O-(CH_2CHO)_y-(CH_2CHO)_z-R_2$$
$$\phantom{F-(CF_2)_x-CH_2CH_2O-(CH_2CHO)_y}|\phantom{-(CH_2CHO)}|\phantom{_z-R_2}$$
$$\phantom{F-(CF_2)_x-CH_2CH_2O-(CH_2CHO)_y}R\phantom{-(CH_2CHO)_z}R_1$$

wherein:
x is an integer from 2–12 or an integer or fractional integer representing an average value of from 2–12;
y and z are each individually an integer from 0–20 or an integer or fractional integer representing an average value of from 0–20;
R and $R_1$ are each individually hydrogen or an aliphatic hydrocarbon radical containing from 1–4 carbon atoms; and
$R_2$ is hydrogen or an ester group of the formula $$-C\!\!\begin{array}{c}{\scriptstyle /\!/O}\\ {\scriptstyle \backslash R_3}\end{array}$$

wherein $R_3$ is an aliphatic hydrocarbon radical containing from 1–4 carbon atoms; and
combining a gas or mixture of gases with the resulting liquid-surfactant mixture to form a foam therefrom.

2. The method of claim 1 wherein said one or more alcohols are lower alcohols selected from the group consisting of methanol, ethanol, n-propanol, isopropanol and mixtures of two or more such alcohols.

3. The method of claim 1 wherein said foam-forming surfactant is combined with said liquid in an amount in the range of from about 0.1% to about 2.0% by weight of the resulting liquid-surfactant mixture.

4. The method of claim 1 wherein said liquid is an aqueous alcohol solution containing one or more lower alcohols in an amount in the range of from about 50% to about 99% by weight of said solution.

5. The method of claim 1 which is further characterized to include the step of combining a viscosity increasing agent with said liquid-surfactant mixture prior to combining said gas or mixture of gases therewith.

6. The method of claim 5 wherein said viscosity increasing agent is selected from the group consisting of hydroxypropyl guar, hydroxyethylcellulose and polyvinyl pyrrolidone.

7. The method of claim 1 wherein said gas is selected from the group of air, carbon dioxide and nitrogen.

8. The method of claim 1 wherein x is an average value of 8, y is 2, z is 0 and R, $R_1$ and $R_2$ are all hydrogen.

9. A method of treating a water-sensitive subterranean formation wherein a treating fluid foreign to the formation is introduced therein comprising the steps of:
forming a foamed treating fluid having a vapor phase and having a liquid phase comprised of one or more alcohols or aqueous solutions thereof and a nonionic foam-forming surfactant or mixture of nonionic surfactants having the structural formula:

$$F-(CF_2)_x-CH_2CH_2O-(CH_2CHO)_y-(CH_2CHO)_z-R_2$$
$$\phantom{F-(CF_2)_x-CH_2CH_2O-(CH_2CHO)_y}|\phantom{-(CH_2CHO)}|\phantom{_z-R_2}$$
$$\phantom{F-(CF_2)_x-CH_2CH_2O-(CH_2CHO)_y}R\phantom{-(CH_2CHO)_z}R_1$$

wherein:
x is an integer from 2–12 or an integer or fractional integer representing an average value of from 2–12;
y and z are each individually an integer from 0–20 or an integer or fractional integer representing an average value of from 0–20;
R and $R_1$ are each individually hydrogen or an aliphatic hydrocarbon radical containing from 1–4 carbon atoms; and
$R_2$ is hydrogen or an ester group of the formula $$-C\!\!\begin{array}{c}{\scriptstyle /\!/O}\\ {\scriptstyle \backslash R_3}\end{array}$$

wherein $R_3$ is an aliphatic hydrocarbon radical containing from 1–4 carbon atoms; and
introducing said foamed treating fluid into said formation.

10. The method of claim 9 wherein said one or more alcohols are lower alcohols and are selected from the group consisting of methanol, ethanol, n-propanol, isopropanol and mixtures of two or more such alcohols.

11. The method of claim 9 wherein said foam-forming surfactant is present in the liquid phase of said foam in an amount in the range of from about 0.1% to about 2.0% by weight of said liquid phase.

12. The method of claim 9 wherein said liquid phase is comprised of an aqueous alcohol solution containing one or more alcohols and said foam-forming surfactant or mixture of surfactants, said alcohol or alcohols being present in said aqueous alcohol solution in an amount in the range of from about 80% to about 99% by weight of said solution.

13. The method of claim 9 wherein said liquid phase is further characterized to include a viscosity increasing agent therein.

14. The method of claim 13 wherein said viscosity increasing agent is selected from the group consisting of hydroxypropyl guar, hydroxyethylcellulose and polyvinyl pyrrolidone and is present in said liquid phase in an amount in the range of from about 0.05% to about 0.5% by weight of said liquid phase.

15. The method of claim 9 wherein said vapor phase of said foamed treating fluid is selected from the group of air, carbon dioxide and nitrogen.

16. The method of claim 9 wherein x is an average value of 8, y is 2, z is 0 and R, $R_1$ and $R_2$ are all hydrogen.

17. A method of fracturing a subterranean formation to stimulate the production of hydrocarbons therefrom comprising the steps of:

forming a fracturing fluid comprised of a foam having a vapor phase and having a liquid phase comprised of one or more alcohols or aqueous solutions thereof and a nonionic foam-forming surfactant or mixture of nonionic surfactants represented by the structural formula:

$$F-(CF_2)_x-CH_2CH_2O-(CH_2CHO)_y-(CH_2CHO)_z-R_2$$
$$\phantom{F-(CF_2)_x-CH_2CH_2O-(CH_2CH)}|\phantom{O)_y-(CH_2CH}|$$
$$\phantom{F-(CF_2)_x-CH_2CH_2O-(CH_2CH}R\phantom{O)_y-(CH_2CH}R_1$$

wherein:
x is an integer from 2–12 or an integer or fractional integer representing an average value of from 2–12;
y and z are each individually an integer from 0–20 or an integer or fractional integer representing an average value of from 0–20;
R and $R_1$ are each individually hydrogen or an aliphatic hydrocarbon radical containing from 1–4 carbon atoms; and
$R_2$ is hydrogen or an ester group of the formula $$-C\underset{R_3}{\overset{O}{\diagup\hspace{-0.5em}\diagdown}}$$

wherein $R_3$ is an aliphatic hydrocarbon radical containing from 1–4 carbon atoms; and
introducing said foamed fracturing fluid into said formation whereby fractures are formed therein.

18. The method of claim 17 which is further characterized to include the step of combining fracture proppant materials with said foamed fracturing fluid whereby said proppant materials are suspended therein prior to introducing said fracturing fluid into said formation.

19. The method of claim 17 wherein said one or more alcohols are lower alcohols and are selected from the group consisting of methanol, ethanol, n-propanol, isopropanol and mixtures of two or more such alcohols.

20. The method of claim 17 wherein said foam-forming surfactant is present in the liquid phase of said foam in an amount in the range of from about 0.1% to about 2.0% by weight of said liquid phase.

21. The method of claim 17 wherein said liquid phase is comprised of an aqueous alcohol solution containing one or more alcohols and said foam-forming surfactant or mixture of surfactants, said alcohol or alcohols being present in said aqueous alcohol solution in an amount in the range of from about 50% to about 99% by weight of said solution.

22. The method of claim 17 wherein said liquid phase is further characterized to include a viscosity increasing agent therein.

23. The method of claim 22 wherein said viscosity increasing agent is selected from the group consisting of hydroxypropyl guar, hydroxyethylcellulose and polyvinyl pyrrolidone and is present in said liquid phase in an amount in the range of from about 0.05% to about 0.5% by weight of said liquid phase.

24. The method of claim 17 wherein said vapor phase is selected from air, carbon dioxide and nitrogen.

25. The method of claim 17 wherein x is an average value of 8, y is 2, z is 0 and R, $R_1$ and $R_2$ are all hydrogen.

26. A highly stable high alcohol content foam comprised of:

a liquid phase including an alcohol or mixture of alcohols and a foam-forming surfactant, said foam-forming surfactant being a nonionic surfactant or mixture of nonionic surfactants selected from the group represented by the formula:

$$F-(CF_2)_x-CH_2CH_2O-(CH_2CHO)_y-(CH_2CHO)_z-R_2$$
$$\phantom{F-(CF_2)_x-CH_2CH_2O-(CH_2CH)}|\phantom{O)_y-(CH_2CH}|$$
$$\phantom{F-(CF_2)_x-CH_2CH_2O-(CH_2CH}R\phantom{O)_y-(CH_2CH}R_1$$

wherein:
x is an integer from 2–12 or an integer or fractional integer representing an average value of from 2–12;
y and z are each individually an integer from 0–20 or an integer or fractional integer representing an average value of from 0–20;
R and $R_1$ are each individually hydrogen or an aliphatic hydrocarbon radical containing from 1–4 carbon atoms; and
$R_2$ is hydrogen or an ester group of the formula $$-C\underset{R_3}{\overset{O}{\diagup\hspace{-0.5em}\diagdown}}$$

wherein $R_3$ is an aliphatic hydrocarbon radical containing from 1–4 carbon atoms; and
a vapor phase.

27. The foam of claim 26 wherein said alcohol or mixture of alcohols are lower alcohols and are selected from the group consisting of methanol, ethanol, n-propanol, isopropanol and mixtures of two or more such alcohols.

28. The foam of claim 26 wherein said foam-forming surfactant is present in said liquid phase in an amount in the range of from about 0.1% to about 2.0% by weight of said liquid phase.

29. The foam of claim 26 wherein said liquid phase is further characterized to include water therein.

30. The foam of claim 29 wherein said water is present in said liquid phase in an amount in the range of from about 1% to about 50% by weight of said liquid phase.

31. The foam of claim 29 wherein said liquid phase is further characterized to include a viscosity increasing agent therein.

32. The foam of claim 31 wherein said viscosity increasing agent is selected from the group consisting of hydroxypropyl guar, hydroxyethylcellulose and polyvinyl pyrrolidone and is present in said liquid phase in an amount in the range of from about 0.05% to about 0.5% by weight of said liquid phase.

* * * * *